United States Patent [19]

Rodloff et al.

[11] Patent Number: 4,666,302

[45] Date of Patent: May 19, 1987

[54] RING LASER, IN PARTICULAR FOR A RING LASER TYPE OF GYRO, HAVING A BLOCK WITH AN OPTICAL RESONATOR CAVITY AND THREE CORNER MIRRORS

[75] Inventors: Rüdiger K. Rodloff, Meinersen; Werner W. Jungbluth, Königslutter, both of Fed. Rep. of Germany

[73] Assignee: Deutsche Forschungs- und Versuchsantalt für Luft- und Raumfamrt e.V., Cologne, Fed. Rep. of Germany

[21] Appl. No.: 717,396

[22] Filed: Mar. 29, 1985

[30] Foreign Application Priority Data

Mar. 31, 1984 [DE] Fed. Rep. of Germany ....... 3412015

[51] Int. Cl.$^4$ ............................................. G01C 19/64
[52] U.S. Cl. ....................................... 356/350; 372/94
[58] Field of Search .................... 356/350; 372/31, 94, 372/97, 107

[56] References Cited

U.S. PATENT DOCUMENTS

| | | | |
|---|---|---|---|
| 4,386,853 | 6/1983 | Ljung | 356/350 |
| 4,410,274 | 10/1983 | Ljung | 356/350 |
| 4,432,646 | 2/1984 | Rodloff et al. | 356/350 |

OTHER PUBLICATIONS

"Traveling-Wave Laser Gyrocompass", by J. M. Catherin and B. Dessus, IEEE Journal of Quantum Electronics, vol. QE-3, No. 11, Nov. 1967, pp. 449-453.

*Primary Examiner*—Davis L. Willis
*Assistant Examiner*—S. A. Turner
*Attorney, Agent, or Firm*—Gottlieb, Rackman & Reisman

[57] ABSTRACT

A ring laser for a ring laser type of gyro having a block with an optical resonator cavity therein and three corner mirrors and an amplifier element for optical frequencies. The amplifier element is adjustable and alignable with respect to the block in such a way that it is adaptable mechanically to the beam path resulting from the mirror arrangement determined by the production technology. The production depends basically on arranging the mirrors in such a way that a resonant beam path results. As tolerances with regard to the accuracy of the position of the amplifier element are considerably lower than those with regard to the positions of the mirrors, the position of the amplifier element is specified.

4 Claims, 7 Drawing Figures

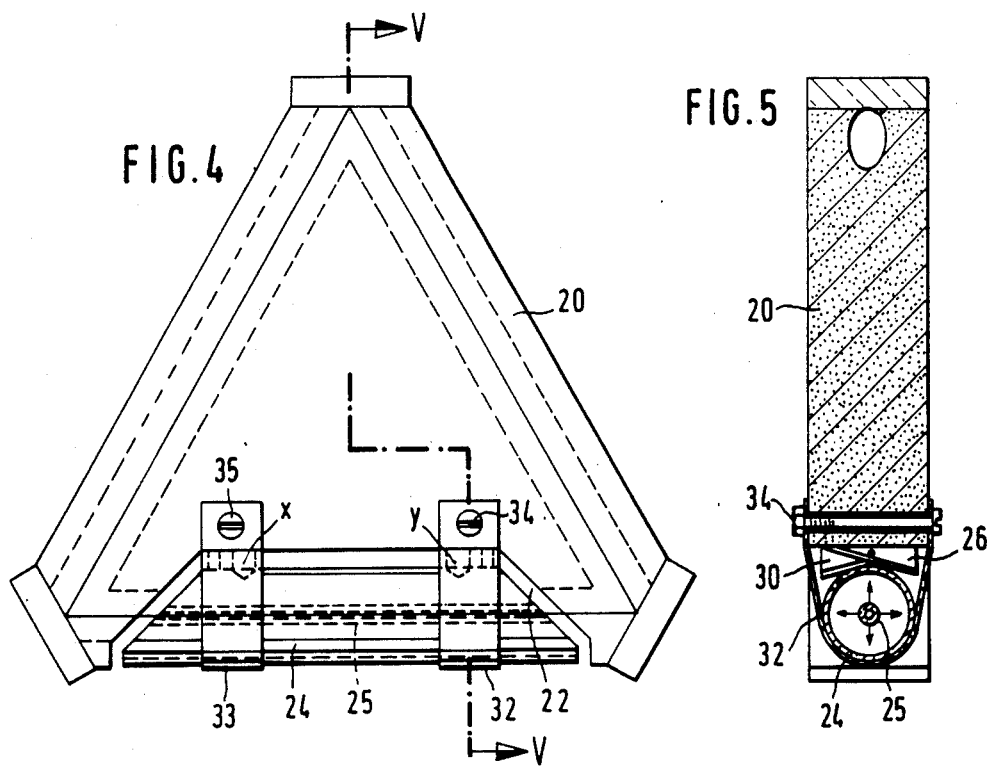
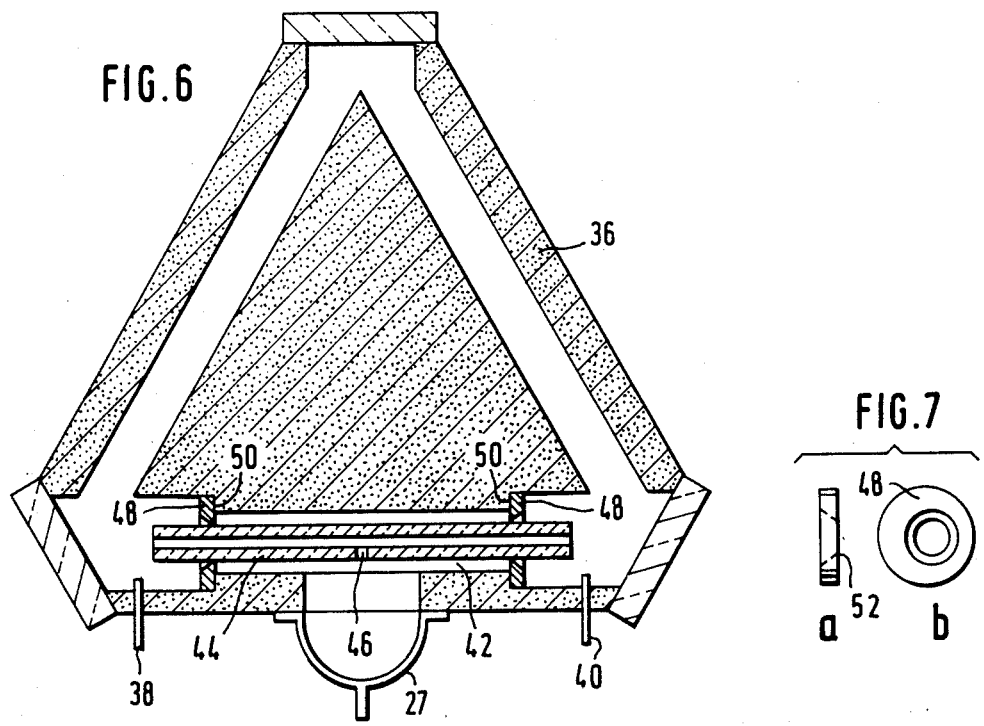

RING LASER, IN PARTICULAR FOR A RING LASER TYPE OF GYRO, HAVING A BLOCK WITH AN OPTICAL RESONATOR CAVITY AND THREE CORNER MIRRORS

FIELD OF THE INVENTION

The invention relates to a ring laser of the kind including a block having an optical resonator cavity therein and three corner mirrors arranged at the apices of a beam triangle and of which one is a concave mirror, wherein the triangle through the planes of the corner mirrors has no angle greater than 90° and the radius of curvature of the concave mirror is greater than $A \cdot \sqrt{3}$ (where A = length of side of the beam triangle), and an amplifier element for optical frequencies.

DESCRIPTION OF THE PRIOR ART

In the production of ring lasers the basic requirements are given positions of the gas discharge capillary tubes and of the amplifier element for optical frequencies. For example, it is customary to begin by drilling a tube system in a block, the axis of which forms a triangle. Starting from this triangle the mirror stop faces are cut on the block at the positions given by the gas discharge capillary tubes. The mirror stop faces must therefore be cut with a degree of accuracy of less than one second of arc with respect to the horizontal tilting axis and with a degree of accuracy of a few seconds of arc with respect to the vertical tilting axis perpendicular to the plane of said triangle. The block must therefore be produced with a high degree of precision and may represent a prominent price-determining element in the production of the ring laser.

SUMMARY OF THE INVENTION

The object of the invention is to provide a design of a ring laser for which a considerably less accurate alignment of the mirror stop faces is acceptable and which is therefore easier to produce.

According to the invention the amplifier element is adjustable and alignable with respect to the block in such a way that it is adaptable mechanically to the path of the beam resulting from the mirror arrangement.

The amplifier element may be a gas discharge tube separate from the block and have means for adjusting and aligning the tube comprising two adjustable pairs of support wedges mounted on the block by which the tube is adjustable in the plane of the beam triangle and perpendicular thereto and a mechanical mount for the tube keeping the tube in contact with said pairs of support wedges.

Alternatively the amplifier element may be integrated in the block and comprise a discharge capillary tube which is radially adjustable between two of the mirrors at two points spaced a certain distance apart in the length of the discharge capillary tube.

The discharge capillary tube may be a capillary which is positioned by two discs having eccentric drilled holes therein in the cavity of the block, whereby the capillary is adjustable with respect to the beam path.

BRIEF DESCRIPTION OF THE DRAWINGS

The invention is illustrated by way of example in the drawings and is subsequently described in detail with the aid of the drawings, in which:

FIG. 4 shows a first embodiment of a ring laser according to the invention in plan view.

FIG. 5 shows a section along the line V—V in FIG. 4.

FIG. 6 shows a plan view of a further embodiment of a ring laser according to the present invention.

FIG. 7a shows a side view of an adjusting disc, as is used in the case of the arrangement according to FIG. 6.

FIG. 7b shows a plan view of the disc shown in FIG. 7a.

DESCRIPTION OF THE PREFERRED EMBODIMENTS

Figure 1:
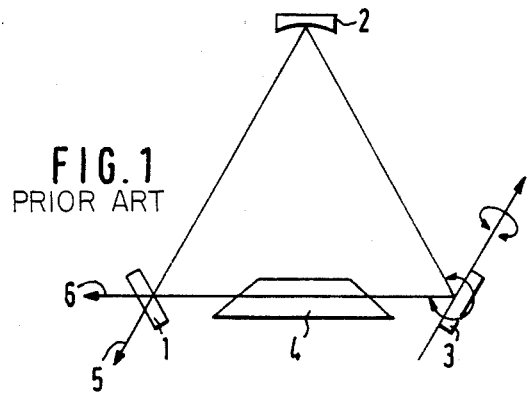
FIG. 1 shows schematically the design of a ring laser according to the prior art.

As is shown schematically in FIG. 1, in general a ring laser has three corner mirrors 1, 2 and 3, corner mirror 2 being a concave mirror. The ring laser also includes an amplifier element 4 for optical frequencies. A He—Ne gas discharge tube is normally used as such an amplifier element. The portions 5 and 6 of the beam are separated via the corner mirror 1 and in the case of the laser type of gyro a velocity of rotation reading is derived from these portions in a known manner.

Figure 2:
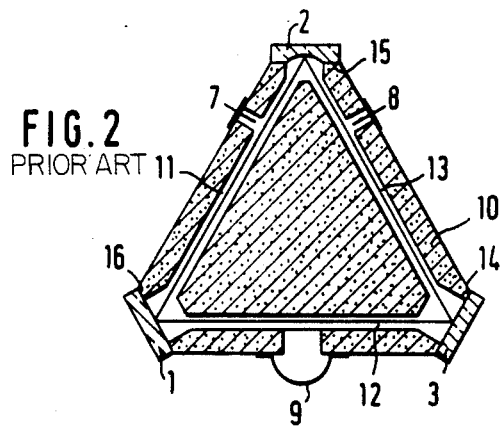
FIG. 2 shows schematically a known ring laser with integrated gas discharge.

FIG. 2 shows schematically a ring laser with integrated gas discharge, as is often used for ring laser type of gyros. In this case, a triangular tube system is drilled in a block 10 of a glass ceramic having the tubes 11, 12 and 13 at its ends closed by the corner mirrors. This system is filled with a He—Ne gas mixture. Anodes 7 and 8 together with a cathode 9 are provided for starting the gas discharge.

As was mentioned initially, in known ring lasers the required positions of the gas discharge capillary tubes 11, 12 and 13 and the stop faces 14, 15 and 16 on the block 10 on which are arranged the mirrors 1, 2 and 3 must be aligned with respect to the horizontal tilting axis with a degree of accuracy of less than one second of arc and with respect to the vertical tilting axis with a degree of accuracy of a few seconds of arc.

Figure 3:
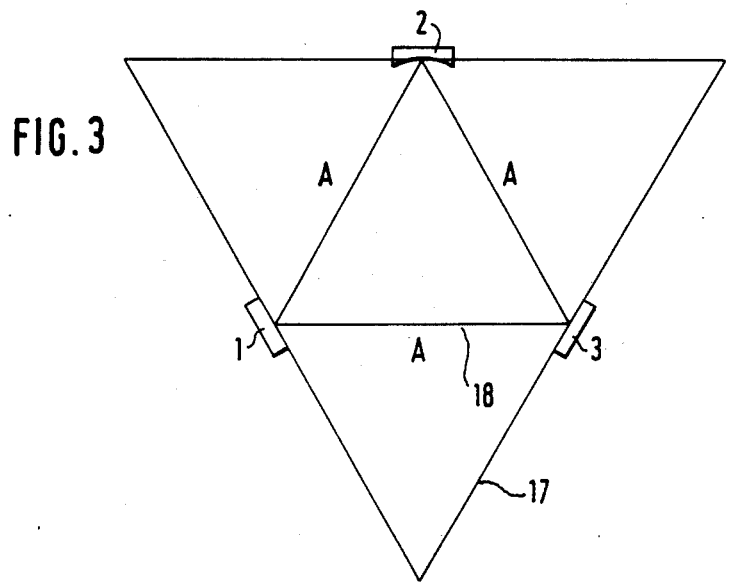
FIG. 3 shows the alignment of the beam triangle in the horizontal plane.

The invention presupposes, as is shown by FIG. 3, that the triangle 17 (FIG. 3), the sides of which go through the planes of the corner mirrors, does not have any angle greater than 90°. Moreover, the radius of curvature of the concave mirror 2 should be as great as possible but should under no circumstances be smaller than $A \cdot \sqrt{3}$, where A corresponds to the length of side of the in this case more or less equilateral beam triangle. Apart from this, the known criteria of stability for optical resonators apply for the radius of curvature.

If the aforementioned conditions are fulfilled then there is always a closed path for resonant rotation between the three corner mirrors, irrespective of the positioning of the mirrors.

The beam triangle can be moved vertically, i.e., perpendicular to the plane of the mirror triangle, if one mirror is angularly displaced or tilted about the horizontal axis at mounting. If all three mirrors are tilted in the same direction then the angle of rotation $\alpha$ in the case of a maximum effective mirror diameter D and a radius of curvature of the concave mirror R is approximately equal to:

$$\alpha \simeq \tfrac{1}{2} \arctan\left(\frac{D}{R}\right)$$

This means that if D=10 mm and R=1000 mm and each of the three mirrors is tilted by 10 min of arc about the horizontal axis a resonant beam path still exists between the mirrors.

In case of a radius of curvature of R=5000 mm the maximum admissible tilting angle is still equal to 2.3 min of arc.

It can therefore be established in summary, that in order to adhere to the conditions under which a resonant beam path still exists between the mirrors, the corner mirrors can be tilted within relatively large limits about the vertical axis, while faulty alignments of a few minutes of arc are admissible about the horizontal axis depending on the radius of curvature of the concave mirror, without, in principle, the resonance capacity of the mirror system being adversely affected.

Given the aforementioned conditions, the position of the amplifier medium is, according to the invention, adapted to the position of the resonant path of light between the mirrors which results from the design described. The basic idea of the invention therefore consists, in the case of the design of a ring laser, not in specifying the position of the gas discharge capillary tube or of the amplification medium subject to the requirement of being able to position the mirrors with known high degree of accuracy; but instead in adapting the laser medium to the optical resonator which is generally produced with much lower tolerances. The positioning accuracy can thereby be reduced by two orders of magnitude. This leads to a considerable simplification in production. It also presents the additional advantage that the positioning accuracy and stability requirements with regard to the amplifier element for optical frequencies are considerably lower than those required with regard to the mirrors.

There results therefore from a pyramidal error caused by a tilting of the mirror by 0.04 sec. about the horizontal axis inside the ring laser a beam misalignment of 3.4 μm in the case of a radius of curvature of the concave mirror of 6 m and a resonance cavity length of 45 cm. Stabilisation or adjustment of the gas discharge capillary tube at 3.4 μm represents no problem at all. Thus if a conventional glass gas discharge tube is used, the gas discharge capillary tube is displaced by around 3 μm if the discharge tube is fastened on one side and the temperature increases by 100° C., in the case of a tube diameter of 2 cm and a coefficient of thermal expansion of $3 \times 10^{-6}$/°C.

In FIG. 4 an embodiment of a ring laser according to the present invention which provides for an adjustable and alignable fastening of the amplifier element in or on the block is shown, whereby the amplifier element can be adapted mechanically to the path of the beam which results from the mirror arrangement given by production. In the block 20, which is normally composed of a ceramic material with an extremely low coefficient of thermal expansion (e.g., $5 \times 10^{-8}$/°C. in the case of the "Zerodur" material produced by the Schott company) an aperture or recess 22 is provided in one side of the block. The remaining design of the block with the corner mirrors and the discharge capillary tubes is already known and need not to be further explained here. A gas discharge tube 24 which is designed in the conventional way and which features a conventional glass tube with the aforementioned coefficient of thermal expansion of $3 \times 10^{-6}$/°C. is arranged in the aperture 22. The glass tube contains a capillary tube 25 in which the gas discharge takes place and through the axis of which the beam is to run.

Two pairs of adjusting wedges 26, 30 forming supports are arranged on the block 20 at two respective points X and Y a certain distance apart. The adjusting wedges 26, 30 of each pair are designed with opposing gradient and can each be adjusted independently of the other perpendicular to the plane of the beam and can be locked together. By adjustment of the wedges 26, 30 the gas discharge tube 24 can be moved horizontally as well as vertically relative to the block 20, as is shown by the four arrows in FIG. 5. Angular adjustment of the gas discharge tube 24 is possible moreover by variable adjustment of the wedges 26, 30 at the two contact points X and Y. The tube 24 is maintained in position against the wedge-formed supports by elastic clamp straps 32, 33. The clamp straps are fastened to the block 20 by screws 34 and 35.

If the two wedges 26, 30 forming the supports are manufactured from a thermally stable material, such as, for example, from the same material as the block, a positioning stability of the gas discharge tube results and therefore a stability of the gas discharge capillary tube which is better than the stability of the beam path, which is affected by the position of the resonator mirrors, and also bearing in mind the twisting or bending of the block as a result of temperature influences. In the case of a temperature difference of 2° C., a block produced from a material with a coefficient of thermal expansion of $5 \times 10^{-8}$/°C. of length 10 cm and thickness 2.5 cm bends in such a way that the faces which support the mirrors tilt by 0.04 sec. This leads to a beam displacement of 3.4 μm. FIG. 6 shows an embodiment of the invention in the case of a ring laser with integrated gas discharge, as is represented schematically in FIG. 2. The drilled holes in the block 36 in which the beam runs are here filled with a He—Ne gas. Two anodes 38, 40 are provided and these are arranged in the area of the ends of one of the drilled holes. The cathode 27 is arranged in the centre between these. A gas discharge capillary 44 is arranged in the capillary tube 42 and is provided centrally in the area of the cathode 27 with a lateral drilled hole 46. The capillary 44 is positioned with the aid of two discs 48 having eccentric holes therein and which are positioned adjacent stops 50 in the block. Such a disc is shown in FIG. 7. The discs 48 allow the axis of the capillary 44 to be tilted and adapted to the beam geometry resulting from the production tolerances. It is advisable that the eccentric drilled holes be spotfaced on at least one side, so that the capillary 44 is positioned on an annular edge 52 inside each disc 48. In order to achieve a fine adjustment, the bore inside the capillary can be disposed eccentric to the outer circumference of the capillary. An arbitrary adjustment of the bore in the capillary inside an arcuate region is then possible which results from the added eccentricities of the drilled holes in the discs 48 and of the axis of the bore in the capillary with respect to the geometric centre of the disc 48. The same effect can be achieved by means of a second eccentric disc positioned in the eccentric drilled hole of each first eccentric disc.

The mounting and the adjustment of the position of the beam axis of the amplifier element is also possible in other ways.

What we claim as our invention and desire to secure by Letters Patent of the United States is:

1. A ring laser, in particular for a ring laser type of gyro, which includes a block having a triangular beam path therein and three corner mirrors arranged at the apices of the beam triangle, one of said mirrors being a concave mirror; wherein the improvement comprises: the triangle through the planes of the corner mirrors has no angle greater than 90°, and the radius of curvature of the concave mirror is greater than $A \cdot \sqrt{3}$ (where $A$ = the length of the side of the beam triangle); an amplifier element for optical frequencies, the amplifier element including an optical resonator cavity and being mechanically movable relative to the block; and adjustment means engaging said amplifier element, said adjustment means being operable for shifting said amplifier element so as to adjust the same with respect to the block and align the axis of its optical resonator cavity with the corresponding beam path in such a way that said axis is adapted mechanically to the path of the beam resulting from the actual corner mirror geometry.

2. A ring laser according to claim 1 in which said amplifier element is a gas discharge tube separate from the block, and said adjustment means comprises two adjustable pairs of support wedges mounted on the block and operable for adjusting said tube both in the plane of the beam triangle and perpendicular thereto and a mechanical mount for maintaining the tube in contact with said pairs of support wedges.

3. A ring laser according to claim 1 in which said amplifier element is integrated in the block and comprises a discharge capillary tube, and said adjustment means engage said discharge capillary tube for radially adjusting the same between two of the corner mirrors at two points spaced a certain distance apart longitudinally of the discharge capillary tube.

4. A ring laser according to claim 3 in which said adjustment means comprise two discs having eccentric drilled holes therein, said capillary tube being positioned in the cavity of the block, and said discharge capillary tube extends through said eccentric drilled holes and is in contact with the boundary surfaces thereof, whereby the capillary in said discharge capillary tube is adjustable with respect to the beam path.

* * * * *